Patented Sept. 30, 1947

2,428,196

UNITED STATES PATENT OFFICE 2,428,196

CIRCUIT CONTROL SYSTEM

John Herman Bretthauer and William Cermak, Bronx, N. Y.

Application July 9, 1943, Serial No. 494,092

8 Claims. (Cl. 315—86)

1

This invention relates to a circuit control system particularly designed for controlling the electrical circuits having a battery-operated load and a generator to charge the battery, as for example in a motor vehicle.

It is an object of this invention to provide a new and improved system in which any irregularity in the circuit, such as a short circuit or a blowout, will automatically result in fully protecting the electrical machinery and at the same time, in so far as possible, maintain the maximum amount of the electrical equipment in operation.

It is a further object to provide a circuit having an automatic cut-out which will protect the generator, and which nevertheless will disconnect the generator from the load without danger of sparking at the time of disconnection.

It is a further object to provide a system which will automatically connect in an auxiliary battery and auxiliary lights whenever the circuit conditions necessitate the disconnection of the main battery and lights so that the vehicle may be maintained in operation.

It is a further object to provide a device which will take care of the manifold conditions which may arise and uniformly protect the apparatus in each of them.

This invention is a continuation-in-part of Patent No. 2,326,199 patented August 10, 1943, which was copending herewith. The relay shown herewith is similar to the relay described in the said copending application.

The invention accordingly comprises a system possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings in which.

Figure 1:
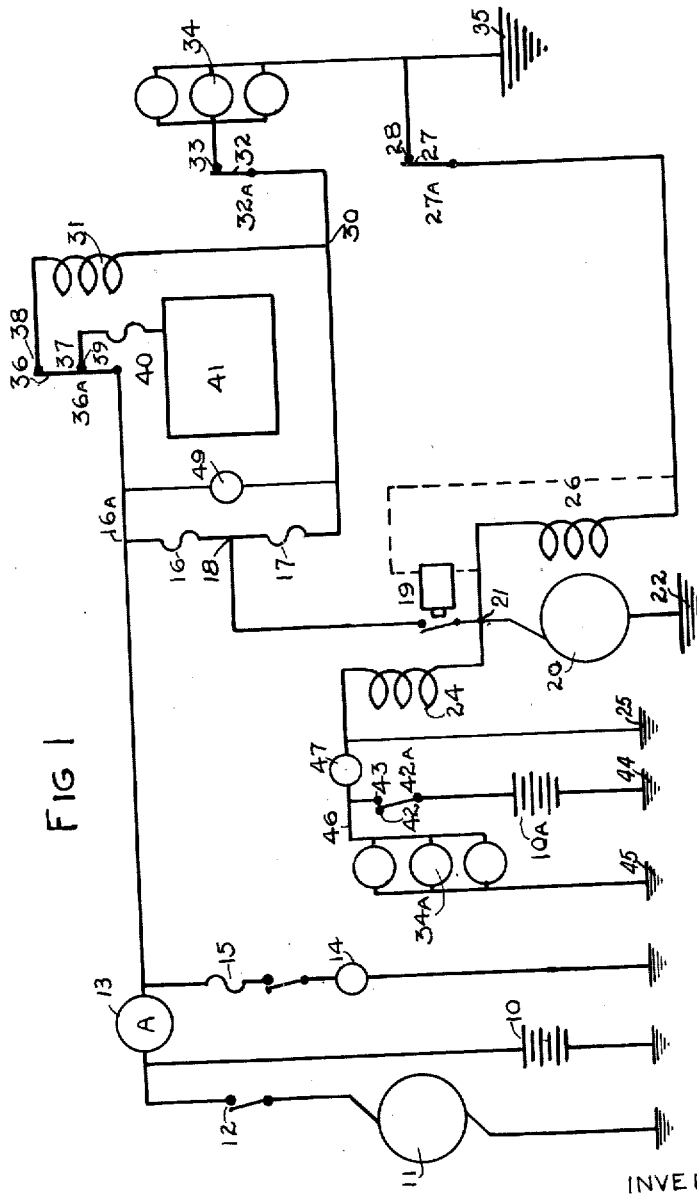
Fig. 1 is a wiring diagram showing the circuit connections of this system.

In the drawings, the numeral 10 indicates the main battery of the motor vehicle. The numeral 11 indicates the starting motor operated by a starting switch 12. 13 is an ammeter. 14 is the ignition separately protected by a fuse 15. As will be seen from the diagram, the starter, the battery and the ignition circuit are all connected to ground on one side. The other sides of the starter and battery circuits are connected together, and through the ammeter 13 to the other side of the ignition circuit and to a fuse 16 at 16ᵃ which is connected at 18 to a fuse 17. This point 18 is connected through the control relay 19 with the generator 20 at the positive pole 21 of the latter, the negative pole being grounded at 22. The field of the generator 20 has one end connected to the positive pole 21, and also connected to one pole of a relay coil 24, the other end of which is connected to ground, as shown in 25. The other side 26 of the generator field coil is connected to a point 27 of a contact 27ᵃ which, when closed against a point 28, connects the field circuit to ground at 35.

The other end of the fuse 17 is connected at 30 with the relay coil 31 and is also connected with a contact 32 of a contact maker 32ᵃ, the other point 33 of which connects with the main lighting circuit 34 of the motor vehicle, the other side of the lighting circuit being connected to ground, as shown at 35.

The point 16ᵃ is connected with an arm 36ᵃ carrying points 36 and 37 arranged to contact respectively points 38 and 39. Point 38 is connected to the other end of coil 31, while 39 connects through a fuse 40 with a radio 41. The numeral 10ᵃ represents the auxiliary battery, one side of which is connected to a point 42 of a back contact maker 42ᵃ, and the other side is connected to ground at 44.

The numeral 34ᵃ represents an auxiliary lighting system which has one side connected at 45 to the ground, and the other side connected by a wire 46 with the contact 43 of contact maker 42ᵃ and through a signal light 47 with the ground at 25. A signal light 49 is connected across the outside terminals of fuses 16—17.

Figure 2:
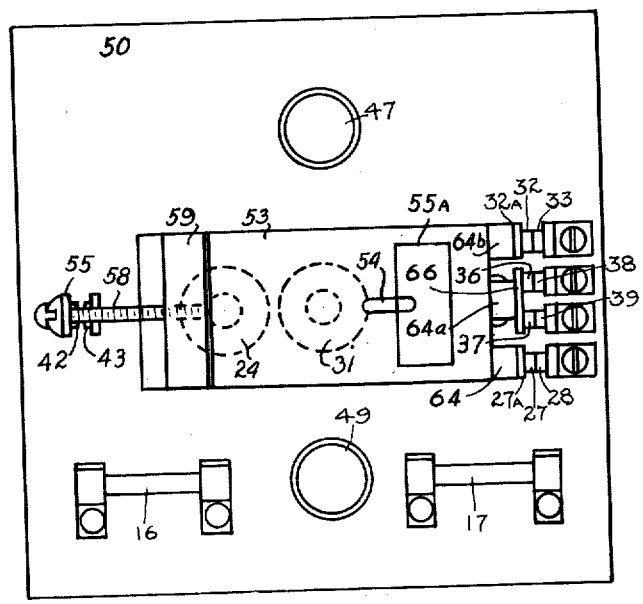
Fig. 2 is a top plan view of the relay described in our copending application, which is suitable for use in this system.
Figure 3:
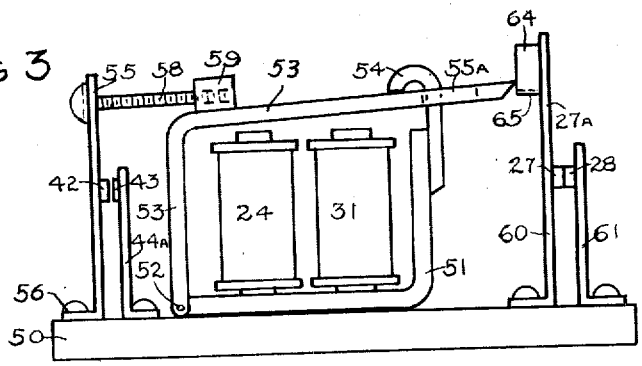
Fig. 3 is a side elevation of the same relay.

The actual assembly of the coils 24 and 31 and of the contacts 27ᵃ, 32ᵃ, 36ᵃ and 42ᵃ and of the signal lights 47 and 49, is shown in Figs. 2 and 3, in which there is provided a base 50, on which is mounted an L-shaped strip 51, and to which, as at 52, is pivoted an L-shaped armature 53. Coils 24 and 31 are mounted upon the strip 51 in position to attract the armature 53 when either one or both of them is energized. A hook 54 extends through an opening 55ᵃ in the armature to limit the upper movement of the latter, and the armature is urged to its upper position by a leaf spring 55 attached at 56 to the base 50 on which the whole apparatus is carried. This spring 55 is connected to the armature by a screw 58 screwing into an insulated strip 59 upon the armature. Thus by turning the screw 58 inward, the tension of the spring 55, and hence the stiffness of the armature resistance, may be adjusted. The contact makers 32ª, 36ª and 42ª are all substantially like contact 27ª which comprises, as shown, a pair of leaf springs 60 and 61 fastened to the insulated base 50 and carrying contacts 27 and 28 respectively. The spring 60 carries an insulated block 64 in position to be engaged either by the end of the armature 53, as shown in Fig. 3, or to have its underface 65 engaged by the upper face of the end of the armature 53 when the latter passes below it, and the construction of the parts is such that when the end of the armature 53 engages the side face of the block 64, the contacts 27 and 28 will be held closed, and this is the normal running position of the apparatus. When, however, the armature 53 has been drawn downwardly below the lower face of the block 64, the resiliency of the springs 60—61 will open the contacts and at the same time will hold the armature 53 down. It will be understood that each of the pairs of contacts 32—33, 36—38 and 37—39 is similarly held closed so long as the magnet is not energized and is similarly opened when either coil is energized.

The underface 65 of the block 64 of the contact 27 is on a lower level than the lower face of the other blocks 64ª and 64ᵇ, so that as the armature is attracted, it will open the circuit to the lights 29 and to the radio before opening the field circuit of the generator 20. The contacts 37, 38 and 39 differ from the other two in that the spring 60 of these latter two contacts is wide enough to engage contacts 38 and 39 simultaneously, as for example it may be provided with a lateral cross piece 66 to carry contact 36 to engage contact 38, and contact 37 to engage contact 39.

The contact 42 is mounted on the spring 55 in registry with the contact 43 on a spring 44ª.

The magnet coil 24 is a voltage coil wound to respond only when the generator voltage rises above the predetermined safe upper limit, while the coil 31 is a current coil wound to respond to a current overload, as for example resulting from a short circuit. Either condition will immediately disconnect the lights 34 and the radio 41 if they are in circuit and thereafter disconnect the field 26 through the contacts 27 and 28. The opening of this latter circuit is deliberately delayed, as the opening of the field circuit is apt to cause a momentary surge of voltage which might otherwise damage the apparatus.

As soon as the armature 53 is actuated by either of the coils, as we have just described, the back contact 42 will immediately connect the auxiliary battery 10ª with the auxiliary lighting system 34ª. After these operations the generator is rendered substantially inert because its field circuit is open. The lighting circuit 34 and the radio are inert because they are disconnected. The ignition circuit 14, however, and the starting motor 11 may still continue to function from the battery 10, so long as that battery is capable of actuating them.

The purpose of connecting the coil 31 through the contacts 36 and 38 is to prevent a continuous drain upon the battery 10 if the fuse 16 should blow, since the actuation of the armature 53 by this coil 31 will disconnect the coil itself, but the circuits will remain in the open or safe position because the end of the armature 53 has been caught below the block 64.

With the above construction, if the fuse 17 burns out, the flow of current from the generator to the lights will be diverted to flow through the coil 31 actuating the armature, and will thus switch on the auxiliary lights from the auxiliary battery 10ª. If on the other hand, the fuse 16 should burn out when the current control relay 19 sticks, the flow of current from the generator to the battery 10, or from the battery to the lights, will be diverted to pass through the coil 31.

If both fuses 16 and 17 are burned out, the generator being completely disconnected will rise in voltage and operate the armature through coil 24, if the generator be running. If the lighting circuit be on, the current, through the coil 31 from the battery, will operate the armature 53. In either case, the auxiliary lights will be connected for service and the generator will be inert.

It will be understood of course that the customary manual control switches may be supplied in any of these circuits.

If the battery cut-out sticks and holds the battery in circuit after the generator has come to rest, the fuse 16 will burn out with the results we have described.

The signal lamp 47 being in circuit with the auxiliary battery 10ª will light whenever the auxiliary battery is in circuit. The signal light 49 will light whenever fuse 16 is burned out.

Since certain changes may be made in the above construction and different embodiments of the invention could be made without departing from the scope thereof, it is intended that all matter contained in the above description or shown in the accompany drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A control system for an electric circuit, said circuit comprising a battery, a generator, and a load, and having two fuses connecting the generator respectively with the battery and the load, which system comprises a magnet-operated circuit breaker having an operating coil connected across the outside terminals of the fuses and its contacts connected in series with the load to break circuit through the load upon fuse failure.

2. A control system for an electric circuit, said circuit comprising a battery, a generator, and a load, and having two fuses connecting the generator respectively with the battery and the load, which system comprises a magnet-operated circuit breaker having an operating coil connected across the outside terminals of the fuses, and having two pairs of contacts, one being connected to break circuit through the load and the other to break circuit through the field of the generator.

3. A control system for an electric circuit, said circuit comprising a battery, a generator, and a load, and having two fuses connecting the generator respectively with the battery and the load, which system comprises a magnet-operated circuit breaker having an operating coil connected across the outside terminals of the fuses, and having two pairs of contacts, one being connected in series with the load to break circuit through the load and the other in series with the field to break circuit through the field of the generator, said circuit breaker being constructed and arranged to break the circuit through the load before the circuit through the field is broken.

4. A control system for an electric circuit, said circuit comprising a battery, a generator, and a load, said system comprising two fuses connecting the generator respectively with the battery and the load, a magnet-operated circuit breaker having a coil connected across the generator armature, and having contacts connected in series with the load to break the circuit through the load.

5. A control system for an electric circuit, said circuit comprising a battery, a generator, and a load, said system comprising two fuses connecting the generator respectively with the battery and the load, a magnet-operated circuit breaker having a coil connected across the generator armature, and having two pairs of contacts, one being connected in series with the load to break the circuit through the load and the other in series with the field to break circuit through the field of the generator.

6. A control system for an electric circuit, said circuit comprising a battery, a generator, and a load, said system comprising two fuses connecting the generator respectively with the battery and the load, which system comprises a magnet-operated circuit breaker having a coil connected across the outside terminals of the fuses, and having a second coil connected across the terminals of the generator, and having two pairs of contacts, one being connected in series with the load to break circuit through the load, and the other in series with the field to break circuit through the field.

7. A device in accordance with claim 6 in which the circuit breaker is constructed and arranged to break the circuit through the load before the circuit through the field is broken.

8. In accordance with claim 6 having an auxiliary battery and an auxiliary lighting system and in which said circuit breaker has a back contact connecting said auxiliary lighting system to said auxiliary battery upon opening of the load circuit.

JOHN HERMAN BRETTHAUER.
WILLIAM CERMAK.

REFERENCES CITED

The following references are of record in the file of this patent:

UNITED STATES PATENTS

| Number | Name | Date |
| --- | --- | --- |
| 2,046,976 | Sorensen | July 7, 1936 |
| 1,298,442 | Bijur | Mar. 25, 1919 |
| 2,106,968 | Dannheiser | Feb. 1, 1938 |
| 1,301,053 | Heany | Apr. 15, 1919 |